(12) United States Patent
Gonzalez Lizardo et al.

(10) Patent No.: US 12,540,857 B2
(45) Date of Patent: Feb. 3, 2026

(54) ULTRAVIOLET SENSING ASSEMBLY

(71) Applicant: Polytechnic University of Puerto Rico, San Juan, PR (US)

(72) Inventors: Angel Gonzalez Lizardo, San Juan, PR (US); Felix A. Cuadrado, Washington, DC (US); Steven L. Velez Sonera, Port Hueneme, CA (US); Ernesto Ulloa Davila, Guaynabo, PR (US)

( * ) Notice: Subject to any disclaimer, the term of this patent is extended or adjusted under 35 U.S.C. 154(b) by 301 days.

(21) Appl. No.: 18/376,751

(22) Filed: Oct. 4, 2023

(65) Prior Publication Data
US 2024/0133747 A1 Apr. 25, 2024

Related U.S. Application Data

(60) Provisional application No. 63/413,525, filed on Oct. 5, 2022.

(51) Int. Cl.
*G01J 5/20* (2006.01)
(52) U.S. Cl.
CPC .................... *G01J 5/20* (2013.01)
(58) Field of Classification Search
CPC .......................................... G01J 5/20
USPC .......................................... 374/121
See application file for complete search history.

(56) References Cited

U.S. PATENT DOCUMENTS

| | | | |
|---|---|---|---|
| 2001/0009268 A1* | 7/2001 | Brown | G01J 1/42 374/128 |
| 2003/0080294 A1* | 5/2003 | Matocha | G01J 1/42 250/339.15 |
| 2022/0146650 A1* | 5/2022 | Li | G01S 17/34 |

FOREIGN PATENT DOCUMENTS

| | | | | |
|---|---|---|---|---|
| CN | 105136310 B | * | 7/2018 | |
| CN | 111928951 A | * | 11/2020 | G01J 5/00 |
| FR | 2629201 A | * | 9/1989 | |
| WO | WO-2009080094 A1 | * | 7/2009 | G01J 5/0018 |

* cited by examiner

*Primary Examiner* — Mirellys Jagan
(74) *Attorney, Agent, or Firm* — Eugenio J. Torres-Oyola; Victor M. Rodriguez-Reyes; Rafael Rodriguez-Muriel

(57) ABSTRACT

A device that uses a UV sensing element capable of converting photons from a high temperature thermal source, to an electrical current. Such current is then compared with the theoretical current to be obtained from a source with the dimensions of the actual source. The theoretical current is obtained by integrating.

1 Claim, 13 Drawing Sheets

(b) Plasma Classification Chart (a) Concentration of Particles as a function of $X$

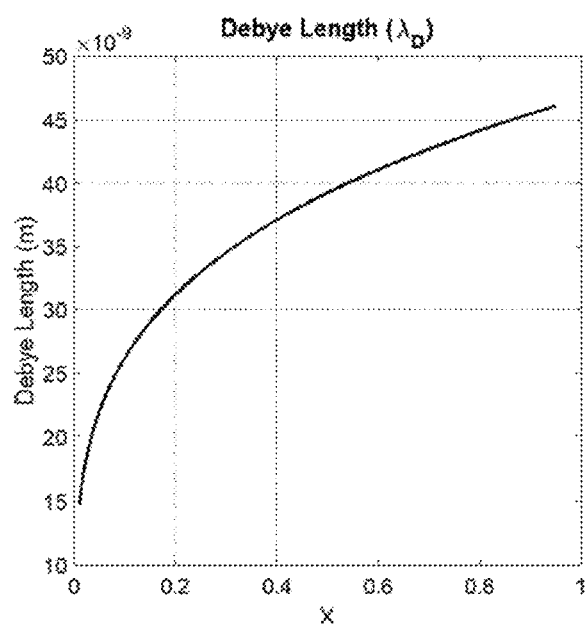
(a) Debye Length as a function of $X$.
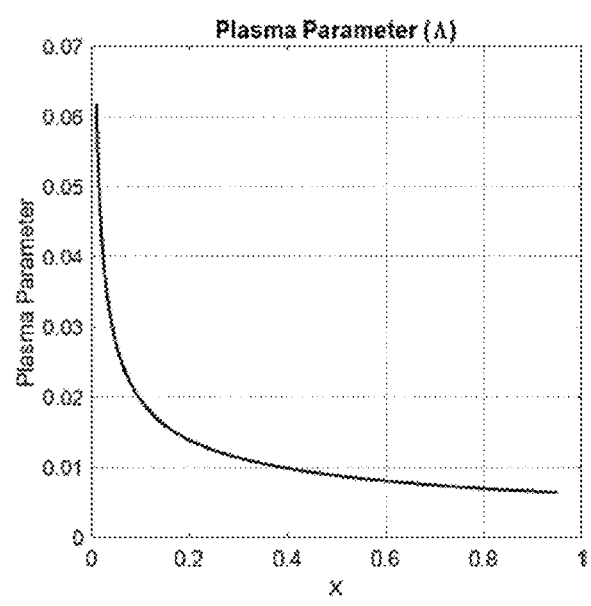
(b) Plasma Parameter as a function of $X$.
Fig. 9a
Fig. 9b

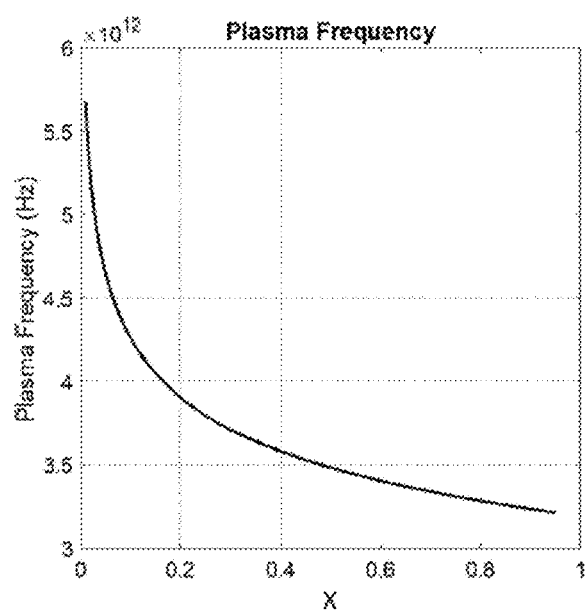
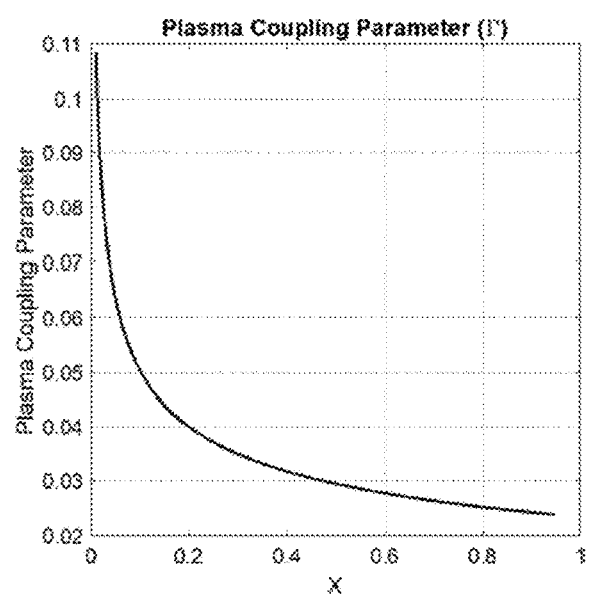
Fig. 10a                                   Fig. 10b (a) Current vs. Temperature at 1.04 m (≈41 in).

(b) Current vs. Temperature 1.41 m (≈55 in).

(d) Current vs. Temperature at 2.95 m (≈116 in).

(c) Current vs. Temperature at 2.21 m (≈90 in).

ULTRAVIOLET SENSING ASSEMBLY

RELATED APPLICATIONS

This application claims the benefit of U.S. Provisional Application No. 63/413,525, filed Oct. 5, 2022, which is hereby incorporated by reference in its entirety to the extent not inconsistent with the disclosure herein.

STATEMENT REGARDING FEDERALLY SPONSORED RESEARCH AND DEVELOPMENT

This invention was made with government support under DOD N00174-19-1-0032 awarded by the U.S Department of Defense. The government has certain rights in the invention.

BACKGROUND OF THE DISCLOSURE

Field of the Disclosure

The present application relates to a device that measures the temperature of a thermal source event and/or object, such as a thermometer. More particularly, the subject disclosure relates to a system and method for measuring temperature using an ultraviolet detector, without having contact with the thermal source.

BACKGROUND

Infrared (IR) thermometers are devices that measure temperature without having physical contact with the object being measured (the "object"). IR thermometers detect the intensity of IR radiation which is naturally emanated from the object's surface. For objects having temperatures in the range of 0°-100° C., the IR thermometer uses an IR sensor that detects IR radiation having wavelengths between 3 and up to approximately 40 micrometers (μm). IR radiation having such wavelengths is commonly referred to as "thermal" radiation. An example of such an IR thermometer includes a medical ear thermometer which measures temperature from the tympanic membrane and surrounding tissues of an ear canal without contact. Known methods, however, do not provide an efficient method for performing non-contact temperature measurements at a distance using UV radiation and circumventing propagation issues.

SUMMARY OF THE DISCLOSURE

To overcome the limitations of the prior art, the subject disclosure provides a method and system for efficiently performing non-contact temperature measurement of a thermal continuous or discrete source. In one embodiment, the subject disclosure provides a sensing assembly which measures the temperature of an event and/or object. The sensing assembly comprises at least one UV sensing element that senses UV radiation, and a processing circuit electrically connected to the at least one UV sensing element. The processing circuit receives signals from the UV sensing element and predicts the temperature of the thermal source event and/or object.

Particularly, the subject disclosure relates to an ultraviolet sensing assembly for performing non-contact temperature measurements, comprising: a detector comprising a photodiode and a resistor; an analog to digital converter; a micro-controller; a digital display; wherein the detector, analog to digital converter, and digital display are functionally connected to the micro-controller; wherein the detector is adapted to detect ultraviolet radiation from a high temperature thermal source and to convert photons from the high temperature thermal source, via the photodiode, into a current of electrons; wherein the analog to digital converter is adapted to receive an analog signal from the detector and to convert the received signal into a digital signal; wherein the micro-controller is adapted to receive the digital signal; wherein by means of Equation 5, the micro-controller is adapted to integrate the current of electrons to calculate a value for the temperature of the high temperature thermal source; wherein the display is adapted to display the temperature of the high temperature thermal source.

In another embodiment, the subject disclosure provides a method for measuring temperature of a thermal source event and/or object using ultra violet (UV) radiation. The method comprises the step of exposing at least one UV sensor to UV radiation from the object to produce at least one UV sensor response. The method further comprises the step of predicting the temperature of the object based on the at least one UV sensor response. The present disclosure may address one or more of the problems and deficiencies of the prior art discussed above. However, it is contemplated that the disclosure may prove useful in addressing other problems and deficiencies in a number of technical areas. Therefore, the claimed invention should not necessarily be construed as limited to addressing any of the particular problems or deficiencies discussed herein.

The subject disclosure constitutes an improvement over existing technologies because of the capacity of the sensing element to respond to UV photons in a wide wavelengths spectrum, that includes UV wavelengths at atmospheric pressure. This means that this invention produces a signal that allows to measure temperatures in the terms of thousand degrees by integrating UV signal.

BRIEF DESCRIPTION OF THE DRAWINGS

These and other features, aspects, and advantages of the present invention will become better understood with regard to the following description, appended claims and accompanying drawings where:

FIGS. 9a-b show estimate for Debye length in units of meters and the plasma parameter, respectively.

FIGS. 10a-b show plasma frequency as a function of X and plasma coupling as a function of X, respectively.

DETAILED DESCRIPTION OF THE DISCLOSURE

Figure 1:
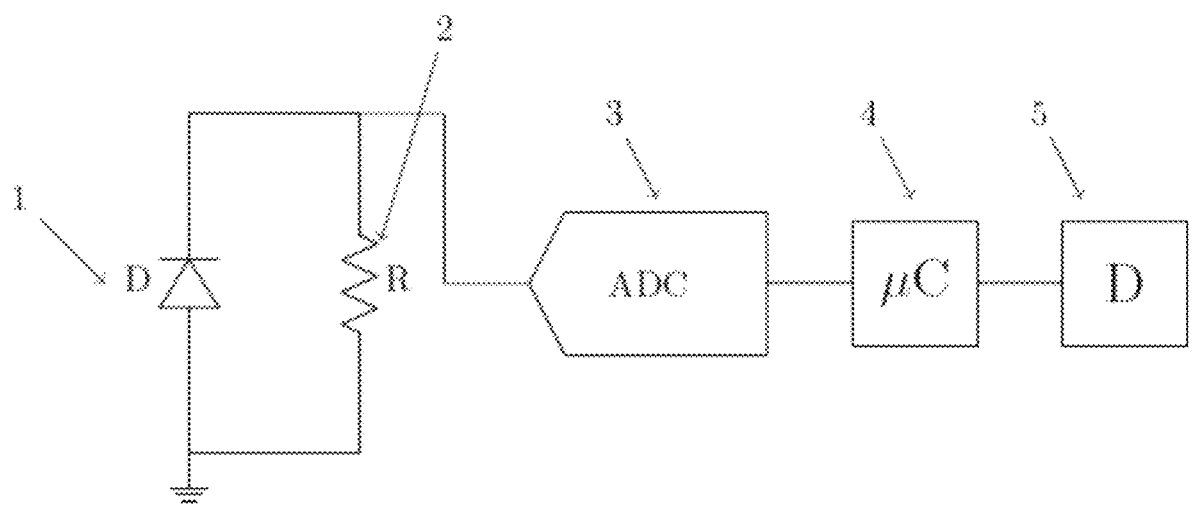
FIG. 1 shows a schematic diagram of a circuit that forms part of an ultraviolet thermometer, in accordance with principles of the present disclosure.

In the Summary above, the Description below, and in the accompanying drawings, reference is made to particular features of the present disclosure. It is to be understood that the disclosure includes possible combinations of such particular features. For example, where a particular feature is disclosed in the context of a particular aspect or exemplary embodiment, or a particular claim, that feature can also be used, to the extent possible, in combination with and/or in the context of other particular aspects and exemplary embodiments, and in the invention generally.

While the specification will conclude defining the features of exemplary embodiments of the disclosure that are regarded as novel, it is believed that the disclosure will be better understood from a consideration of the following description in conjunction with the figures, in which like reference numerals are carried forward.

This subject disclosure is concerned with instrumentation to measure high temperature plasmas basic parameters such as electron temperature and density, using its radiation in the UV band. The subject disclosure relates to performing a number of measurements using an EUV Photodetector and applying an inverted form of the Plank equation and the responsivity function of the Photodetector, to obtain a temperature vs. current characteristic. Once the characteristic is obtained, a simple measurement of the current of the diode gives an estimation of the temperature of the hot plasma.

i. Estimation of Plasma Parameters

Estimates for the various plasma parameters, including temperature T, and concentration of particles, are based on the Planck's black body radiation theory in the form of the Stefan Boltzmann Law, and Wien's Displacement Law. The application of these laws requires the establishing of thermodynamic equilibrium.

ii. Estimation of Temperature and Concentration

Figure 5A:
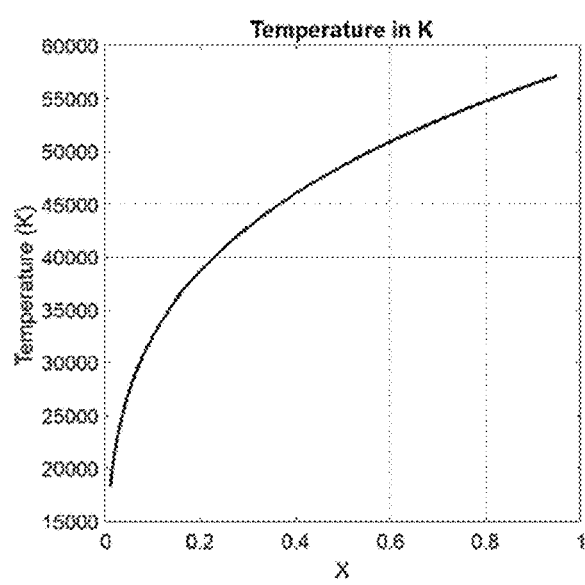
FIGS. 5a-b show graphs of temperature as a function of X (X as the fraction of the thermal source total input power converted to thermal radiation).
Figure 5B:
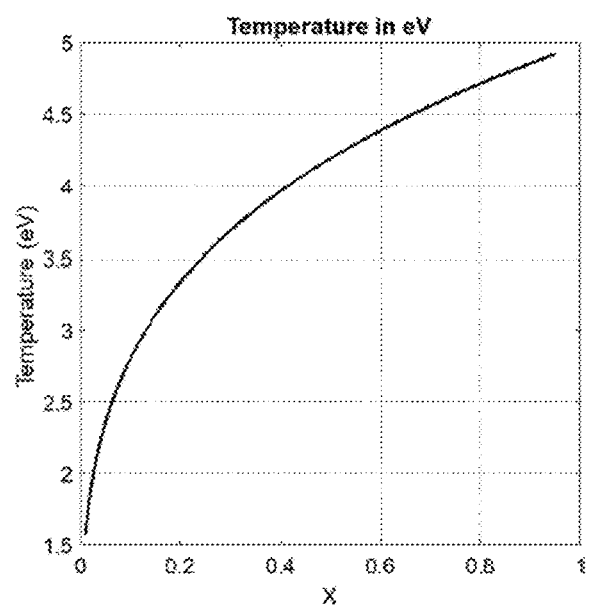

To estimate the temperature of the discharge T, we start by calculating the input power $P_e$ using the product of the current ($\approx 2 \times 10^6$ A) and voltage ($\approx 1,000$ V) at a thermal source. Defining X as the fraction of the total input power converted to thermal radiation:

$$P_{radiated} = \sigma A T 4 = XPe$$

where $\sigma$ is the Stefan-Boltzmann constant and the emissivity assumed to be 1 (ideal radiator). The surface area of the discharge A was estimated to be the surface area of a cylinder with length scale of 10 cm, and diameter of about 1 cm. The temperature obtained is used to calculate thermal speeds and mean free path, that in turn will be used to estimate the "relaxation time" 96, which is the time scale needed for the particles to reach equilibrium by collisions. FIG. 5*a* shows a graph of temperature in K as a function of X. For this plot X was taken in the range from 1% to 95% of the total input power $P_e$. From FIG. 5*a*, the estimate for the temperature of the discharge is in the range from about 18,000 K to 55,000 K. FIG. 5*b* shows temperature expressed in eV.

Assuming standard atmospheric pressure as 101,000 Pa, an estimate for the concentration of particles is simply given by ideal gas law, $$c = n = P/kBT$$

Figure 6B:
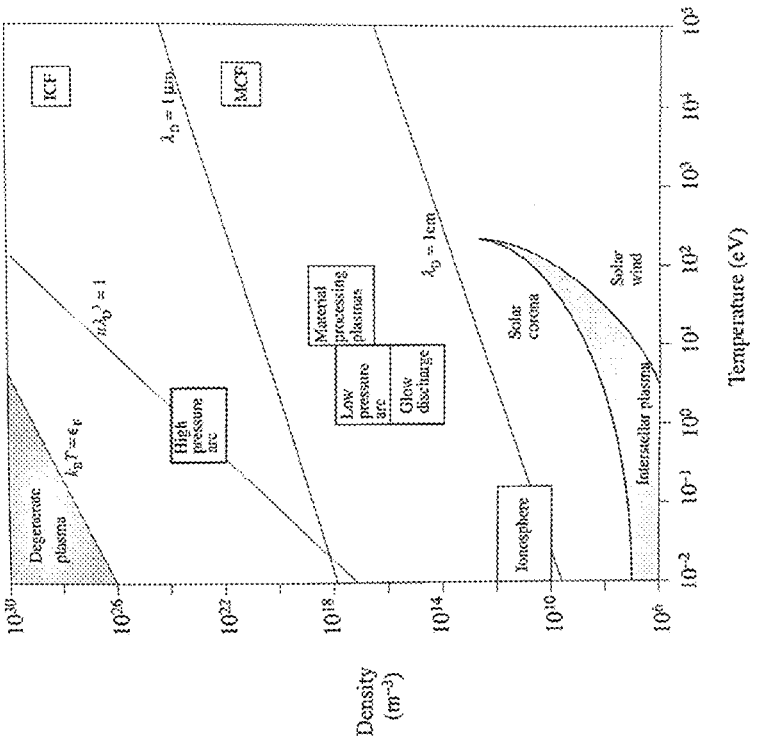
FIGS. 6a-b show a plot of concentration of particles as a function of X and plasma classification chart, respectively.
Figure 6A:
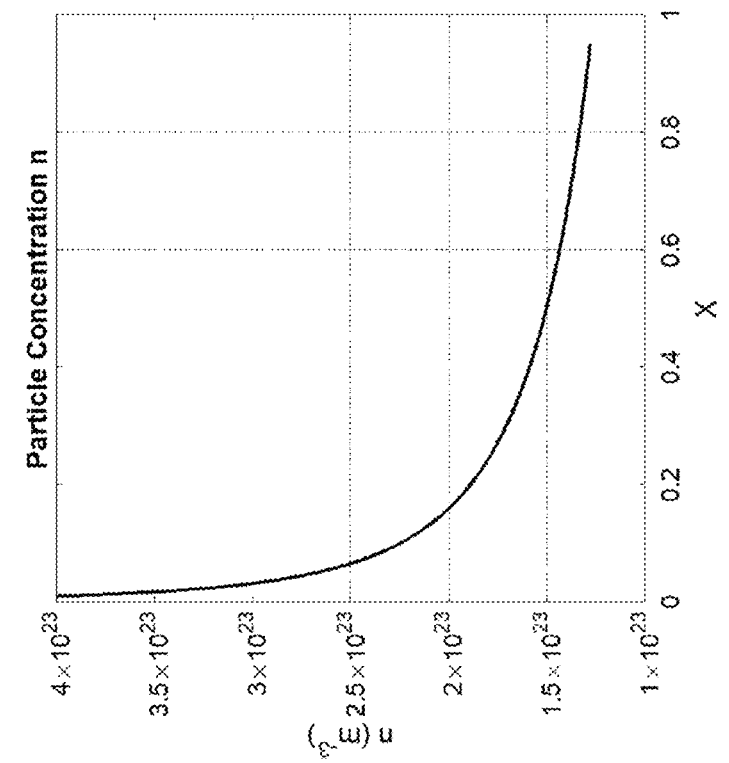

FIG. 6*a* shows a plot of concentration of particles as a function of X, showing an estimated number of orders of magnitude of $\approx 10^{23}$ particles per cubic meter. This temperature and concentration of particles place the plasma range in the "high pressure discharge" plasma classification (see FIG. 6*b*).

iii. Thermodynamic Equilibrium

In order to verify the presence of thermodynamic equilibrium in the discharge to justify the use of the equations above, the mean free path $\ell$ M and the thermal velocity v are calculated, using results from the kinetic theory of gasses, as follows, $$\ell_M = 1/4\pi\sqrt{2}cr^2$$

where c is the concentration, and $\pi r^2$ is the mean molecular cross-sectional area for air particles, given by approximately:

$$\pi r^2 \approx \pi(0.21 \times 343 \text{ pm}^2 + 0.78 \times 364 \text{ pm}^2) = 1,118.25 \text{ pm}^2.$$

Figures 7A, 7B:
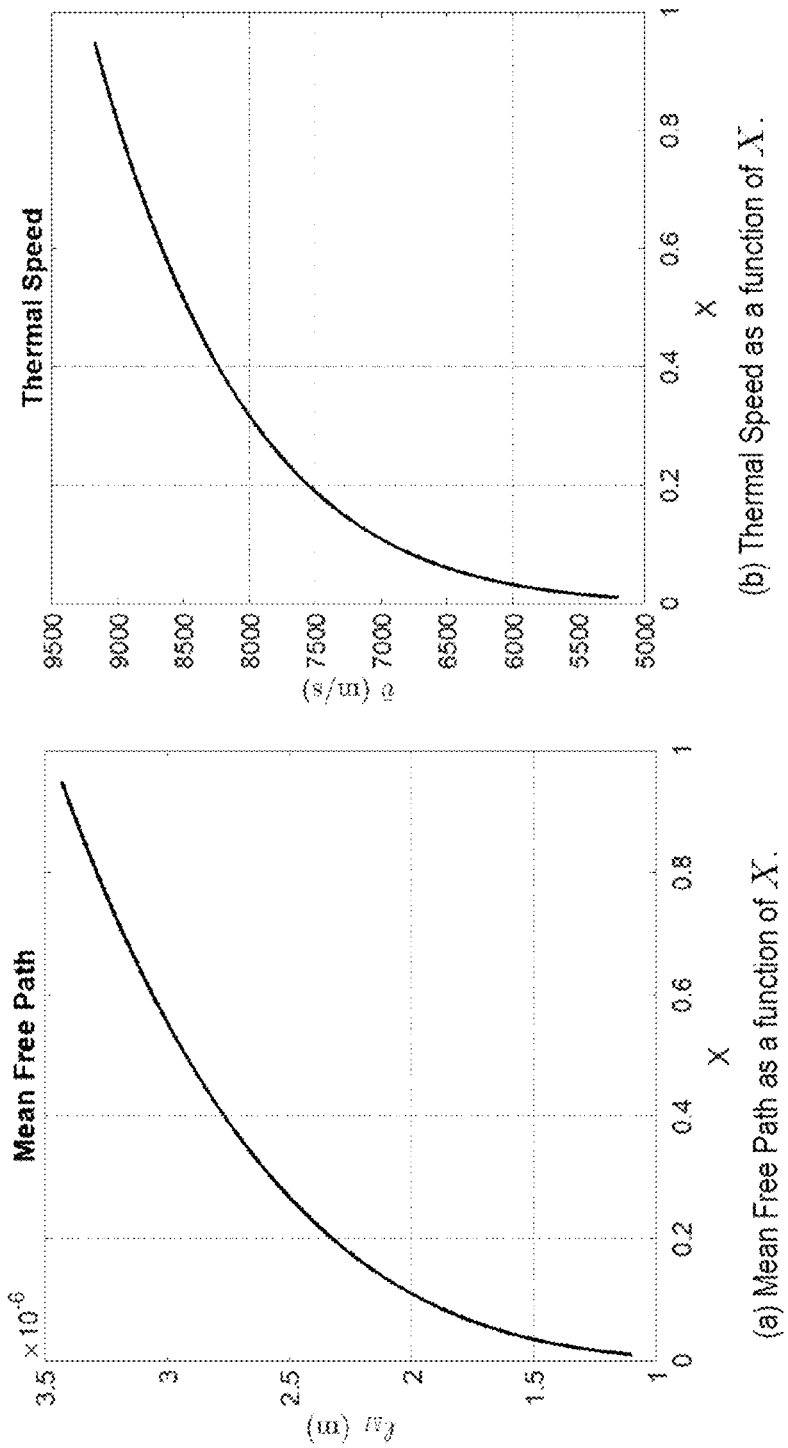
FIGS. 7a-b show the mean Free Path as a function of X and thermal speed as a function of X, respectively.

The radius for molecular nitrogen and oxygen is the mean kinetic radius. Species other than N2 and O2 have not been considered. The result is summarized in FIG. 7*a* showing $\ell$ M in an order of magnitude of $10^{-6}$ m.

Thermal speeds have been estimated by:

$$\bar{v}\sqrt{8k_BT/\pi m}$$

which is strictly valid for spherical molecules, but this suffices the present interest of order of magnitude. The results are plotted in units of m/s vs X in FIG. 7*b*.

We define relaxation time $\tau$, as the time taken for the particle to transverse the mean free path. This time is considered as the average time for particles to collide among themselves and establish thermodynamic equilibrium, and is given by:

$$\tau = \bar{v}/\ell_M$$

Figure 8:
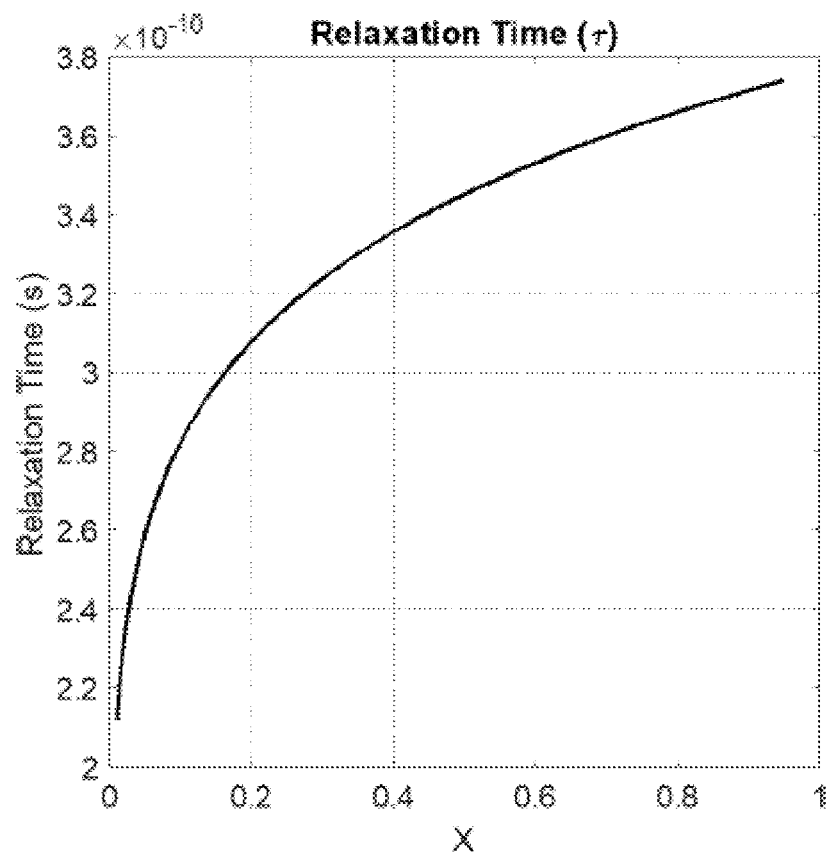
FIG. 8 shows relaxation Time as a function of X.

Estimates for this "equilibrium" time are given in seconds by FIG. 8.

iv. Plasma Discharge Parameters and Behavior

To characterize an ionized gas as a plasma the fundamental parameters are the Debye shielding length $\lambda_D$, the plasma parameter $\Lambda$, have to satisfy certain criteria. A plasma is defined as a collection of electrons, ions and neutrals that shows collective behavior, dominated by electromagnetic forces. Debye length $\lambda_D$ is the characteristic length-scale at which the plasma particle exists as individual charges. In order to have a plasma, as opposed to simply ionized gas, the number of particles in a volume of a Debye sphere must be sufficiently large that a considerable fraction of the particles in a plasma are charged, and therefore able to interact with external electromagnetic fields. The most important criteria is the smallness of $\Lambda$. Debye length and plasma parameter were calculated using the following equations respectively:

$$\lambda D = \sqrt{\epsilon_0 k_B T/e^2 c}$$

$$\Lambda = 1/4\pi n_e \lambda^3 D$$

The estimate for Debye length is shown in FIG. 9*a* in units of meters, and the plasma parameter is summarized in FIG. 9*b*. Plasma frequency by as a function of X is shown in FIG. 10*a*. Plasma frequency is given equation:

$$\omega = \sqrt{ne^2/\epsilon_0 m}$$

The relative influence of electromagnetic forces in the plasma is characterized by the plasma coupling parameter $\Gamma$, which is a ratio of electrostatic energy to thermal energy, and given by the following expression:

$$\Gamma = e^2/4\pi\epsilon_0 k_B T 3\sqrt{4\pi c/3}$$

FIG. 10*b* shows plasma coupling as a function of X.

v. Thermal Radiation Wavelength Estimate

Figure 11:
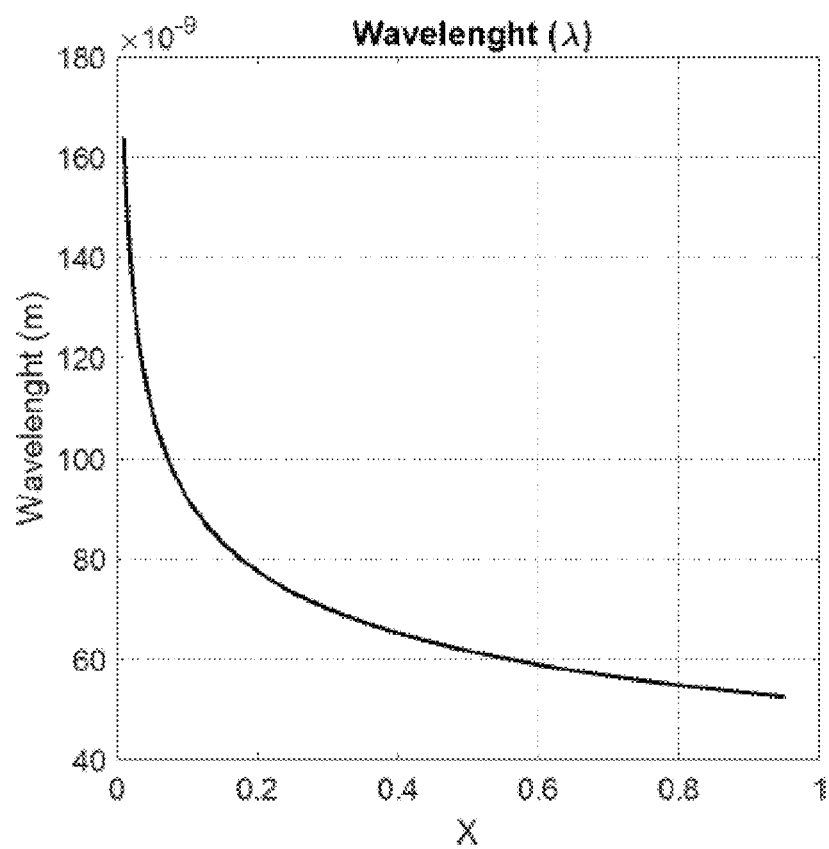
FIG. 11 shows a plot obtained when estimating the wavelength of thermal radiation.
Figure 12A:
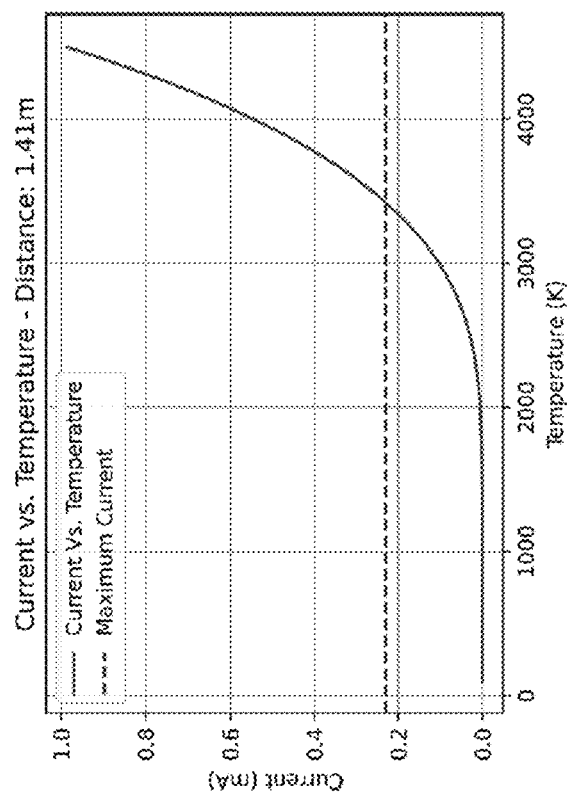
FIGS. 12*a*-*d* show current v. temperature plots for various distances.
Figure 12B:
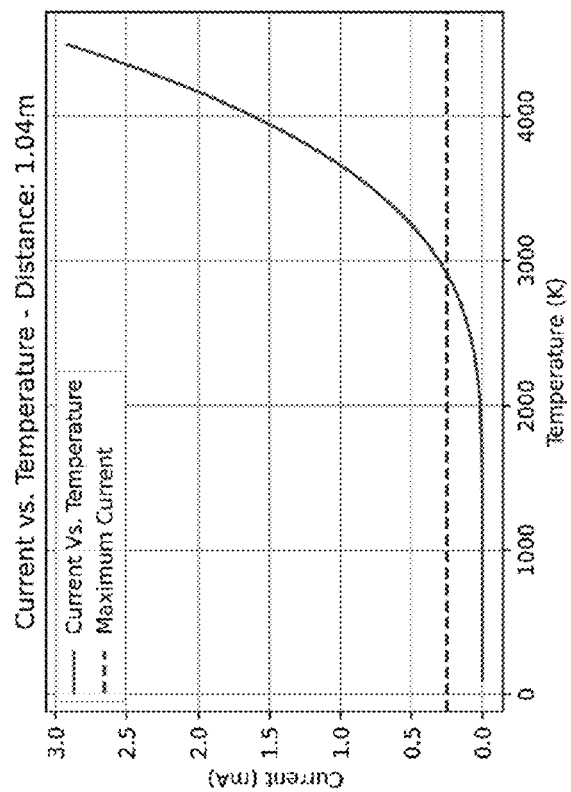
Figure 12D:
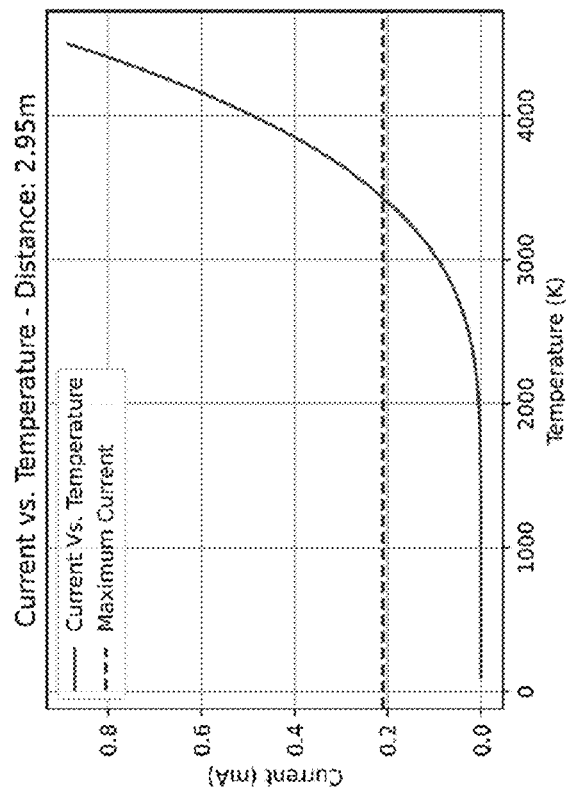
Figure 12C:
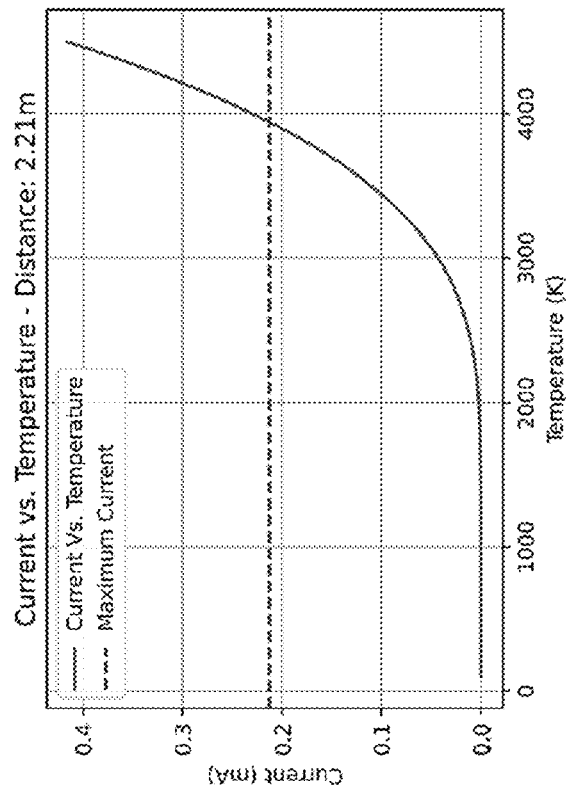

The previous estimates of the relevant plasma parameters suggest a temperature range of order of 18,000 to 55,000 K and a well-established thermal equilibrium in the whole length of the thermal source. To estimate the wavelength characteristic of such temperature range we use Planck's radiation equation:

$$\lambda max \approx 1.26\hbar c/k_B T \approx 3\ mK/T$$

where $\hbar$ is the Planck's constant over $2\pi$, and c is speed of light in vacuum. Using this equation, the wavelength is computed in terms of the radiated pow.003/r fraction, obtaining the plot shown in FIG. 11. This wavelength is in the range of extreme UV. Based on temperature estimates and the validity of thermal equilibrium, the expected thermal radiation will be centered around 75 nm.

Based on the theoretical estimates, we understand that the wavelength of the light emitted by the plasma must be between the spectrum of extreme ultraviolet light to soft x-rays. Moreover, given that the event of phenomenon happens in such a short period of time, it is necessary to have the ability to observe it with a high speed sensor such as a high velocity camera.

vi. UV Sensing Assembly

The subject disclosure provides a system and a method that employs a sensor to perform non-contact measurement of a thermal source (event/object) temperature. The sensor is a UV detector that monitors a portion or the entire UV-vis spectrum from the source. The sensor responds to UV radiation emanated from the source producing an electrical response (current) that is related to the source temperature. The current from the sensor is fed into an analog-to-digital (ND) converter to provide such information to a microprocessor in a digital form.

An equation relating the current at a semiconducting detector to the temperature of the thermal source discharge is obtained as a function of source-detector distance, geometrical parameters of the discharge, and absorption coefficients for UV radiation. The equation gives the current at the diode detector as a function of the setup parameters (distance from source, geometrical parameters of the discharge, effective area of detector), the temperature of the discharge at thermodynamic equilibrium (see previous justification for TE) and the absorption coefficient for UV radiation for the atmosphere). The theory is based on Planck's radiation theory and takes into consideration the quantum efficiency (trough the responsivity function of the detector), the absorption of UV radiation by the atmosphere (mostly by oxygen and nitrogen), and the geometry of the discharge.

The electrical current is related to the source's temperature as a function of the detector distance to the source under measurement, geometrical parameters of the source, the effective area of detector, and the absorption coefficients for UV radiation. The distance from the sensor to the source, geometrical parameters of the source, effective area of detector, and the absorption coefficients for UV radiation have to be determined or measured prior to or during the acquisition of the current.

In order to obtain the desired temperatures, the subject disclosure requires the use of a photodiode detector 1 as a sensor. Equation 1 (shown below) gives the current at the diode detector 1 as a function of the setup parameters (distance from source, geometrical parameters of the source, effective area of detector), the temperature of the discharge at thermodynamic equilibrium and the absorption coefficient for UV radiation for the atmosphere.

$$i(v, T, x, A, \alpha) = B(v, T)S\Omega R \quad \text{Equation 1}$$
$$= \frac{2hv^3}{c^2}\frac{1}{e^{\frac{hv}{kT}}-1}S\frac{A}{x^2}e^{-\alpha x}R$$
$$= \frac{hv^2}{c^2\left(e^{\frac{hv}{kT}}-1\right)}\frac{S}{2}\frac{A}{x^2}e^{-\alpha x}$$

where h is the Planck's constant; c is the speed of light in vacuum; v is the frequency of the black body radiation; k is the Boltzmann's constant; T is the absolute temperature of the black body; S is the area of the thermal source; x is the distance of source to detector; α is the coefficient of UV absorption; A is the area of detector; and R is the diode responsivity.

Figure 3:
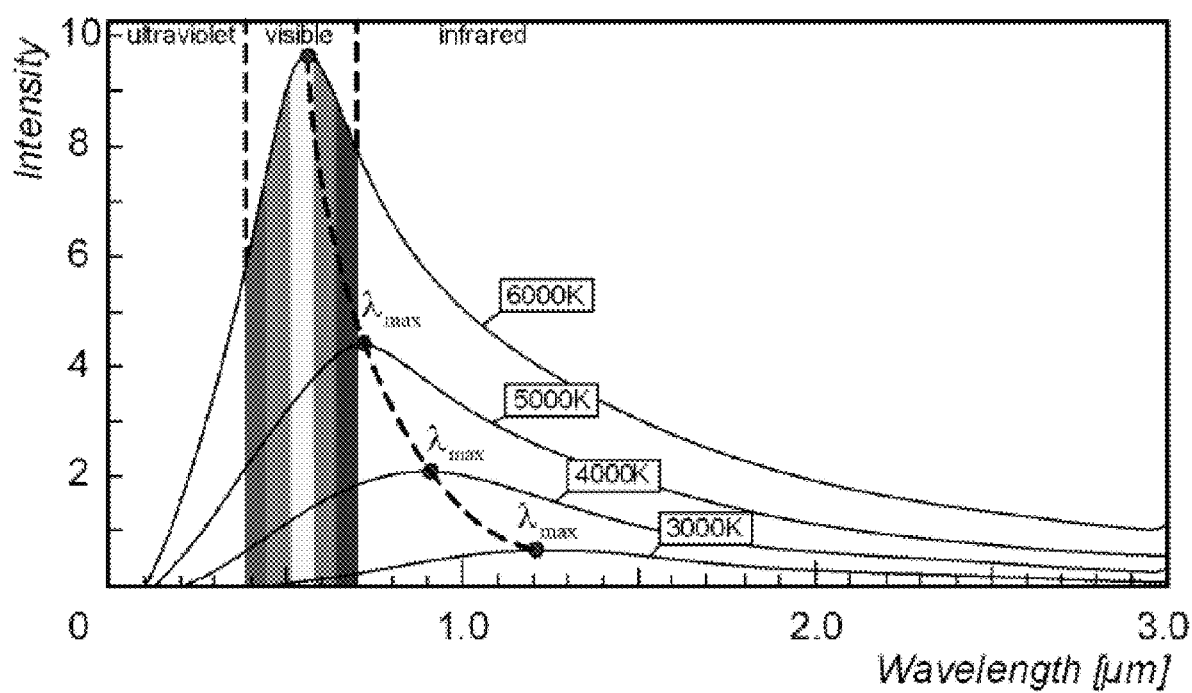
FIG. 3 shows the spectral intensity distribution of Planck's black-body radiation.

Equation 1 is based on Plank's radiation theory and takes into consideration the quantum efficiency (trough the responsivity function of the detector), the absorption of UV radiation by the atmosphere (mostly by oxygen and nitrogen), and the geometry of the source. Plank's law explains the spectral-energy distributed by the radiation emitted by a black body together with the responsivity of the detectors. Planck's law for energy radiated per unit volume by cavity of a black body in a wavelength interval is given by:

$$B(\lambda, T) = \frac{2hc^2}{\lambda^5}\frac{1}{e^{\frac{hc}{\lambda kT}}-1} \quad \text{Equation 2}$$

where k is Boltzmann constant, c is the speed of light, h is Planck's constant and T is the absolute temperature. FIG. 3 shows the spectral intensity distribution of Planck's blackbody radiation.

Photodiodes are semiconductor devices that can detect optical signals through electronic processes. The operation of a general photodetector includes basically three processes: carrier generation by incident light, carrier transport and/or multiplication by current-gain mechanism if present, and extraction of carriers as terminal current to provide the output signal. The photocurrent from the photodiode can be expressed in a metric of responsivity, using the optical power as reference and obtained through Equation 3:

$$\mathcal{R}(\lambda) = \frac{I_{ph}}{P_{opt}} = \frac{\eta q}{hv} = \frac{\eta\lambda(\mu m)}{1.24}, \quad \text{Equation 3}$$

Where $I_{ph}$ is the photocurrent, $P_{opt}$ is the optical power and η is quantum efficiency describes by Equation 4:

$$\eta = \frac{I_{ph}}{q\Phi} = \frac{I_{ph}}{q}\left(\frac{hv}{P_{opt}}\right) \quad \text{Equation 4}$$

From Equations 2, 3 and 4, an equation yielding the output current of a photodiode detector as a function of the distance from source x, geometrical parameters of the discharge ($r^2_d$), effective area of detector (A), the temperature of the discharge at thermodynamic equilibrium (T), and the attenuation coefficient for the atmosphere aα, is derived: from Equation 5:

$$i = \int_{\lambda_{min}}^{\lambda_{max}} \frac{2hc^2}{\lambda^5} \frac{1}{e^{\frac{hc}{\lambda kT}} - 1} 4\pi r_d^2 \frac{A}{x^2} e^{-\alpha x} \mathcal{R}(\lambda) d\lambda \quad \text{Equation 5}$$

Figure 4:
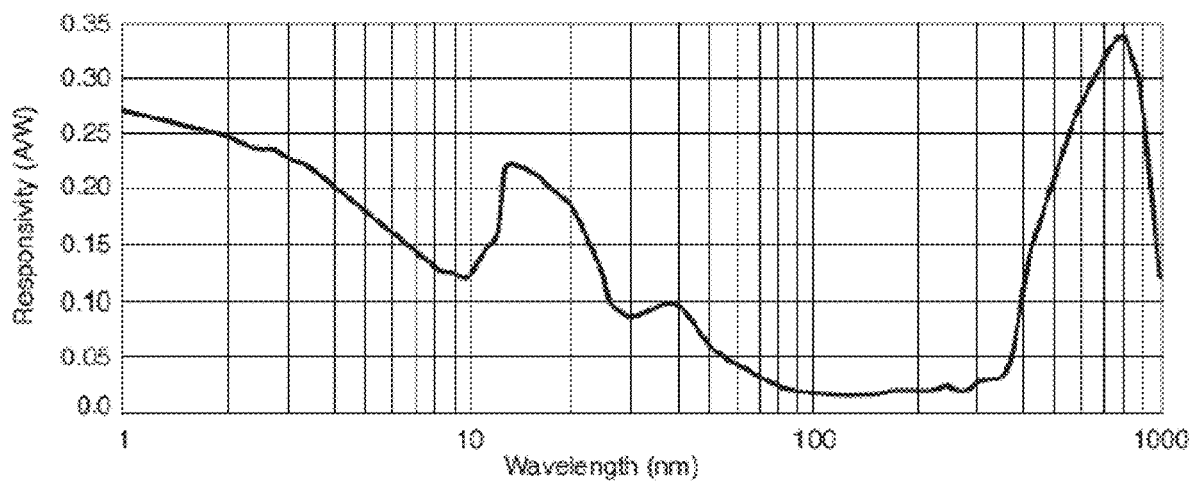
FIG. 4 shows the responsivity plot for the photodiode ultraviolet sensing assembly.

With Equation 5 and using the responsivity curve for the photodiode Opto Diode SXUV100 UV sensor (shown in FIG. 4), an approximate to the current corresponding to the temperature of a source of radiation somewhat similar to the thermal source is obtained. The limits of integration are taken from the range of operation of the diode. Having a close estimate to the temperature of the source allows for fine tuning of the measurement at the lab.

The temperature estimate is obtained by evaluating the current obtained from Equation 5 in a wide range of temperatures (i.e., 1,000° K to 55,000° K in 100° increments), wide enough to make sure that the unit in test temperature is included. A current vs. temperature plot is obtained from the evaluation. The current experimentally obtained is thus compared to the current vs. temperature plot to obtain the temperature estimate.

In sum, through Equation 1, the Plank's law described in Equation 2, the responsivity of the detectors described in Equation 3, where $I_{ph}$ is the photocurrent, $P_{opt}$ is the optical power and η is quantum efficiency described in Equation 4, the sensor photocurrent as a function of temperature is obtained, as described in Equation 5.

With Equation 5, and the responsivity curve from the photodiode manufacturer, a close approximation to the current corresponding to the temperature of a source is obtained.

Figure 2:
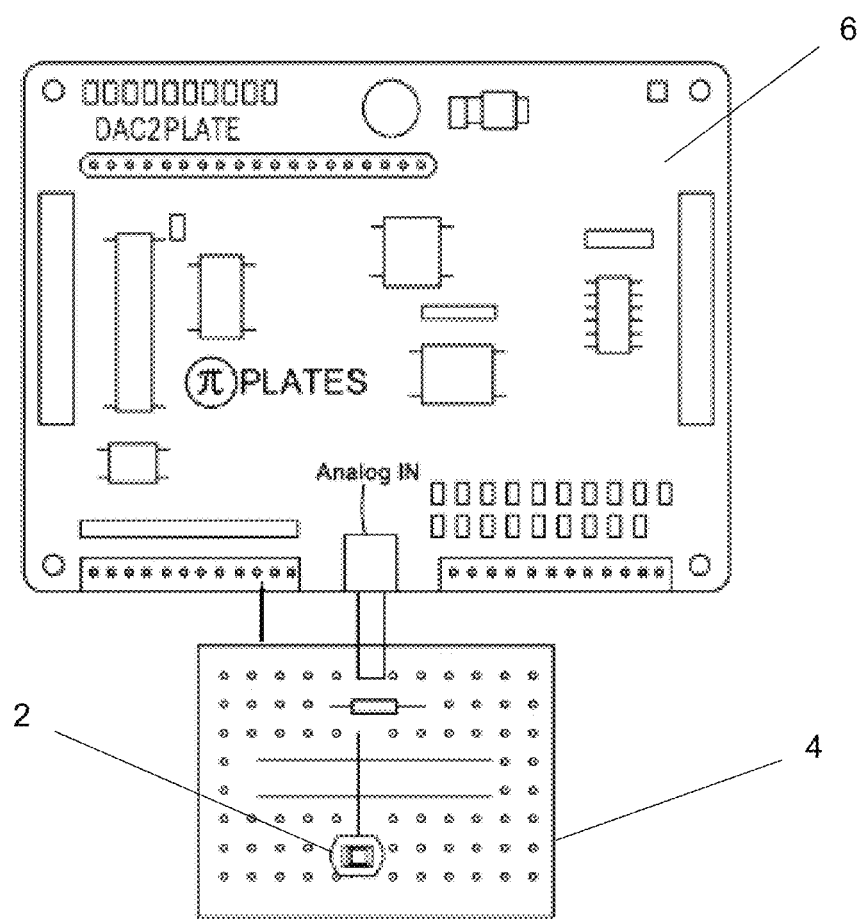
FIG. 2 shows the ultraviolet sensing assembly, in accordance with principles of the present disclosure.

The arrangement in FIG. 1 shows an exemplary arrangement of a preferred embodiment of the sensing assembly. FIG. 1 shows a photodiode 1 together with a resistor 2 which conform the detector D. It should be noted that the diode produces an electric current (or current of electrons) that depends on the amounts of high-energy photons hitting upon the diode. Particularly, the photodiode 1 is adapted to receive photons in the ultraviolet wavelength range emanating from a high thermal source; and to convert the photons into electric current according to what appears on the responsivity graph, shown in FIG. 4. Responsivity measures the number of electrons that are measured for each photon that hits upon the diode. As such, the detector D captures photons from a high temperature thermal source and converts the photos into electric current. The detector D, then provides an analog signal to the Analog to Digital Converter 3, which converts the signal into digital form to be fed to the micro-controller 4, which by means of Equation 5 integrates the current of electrons and finds a value for the temperature in the i vs T characteristic of the detector. The obtained temperature is then sent to an adequate digital display 5, which could be embodied by a 7-segment display assembly, an LCD screen, a computer, or any other electronic device able to display a digital number. FIG. 2 shows the ultraviolet sensing assembly, in accordance with principles of the present disclosure. The micro-controller 4 may be a Raspberry Pi 4 Model B Micro-controller and the detector 2 may be an Opto Diode SXUV100 UV sensor.

An experiment to verify the described method to obtain the temperature of the plasma discharge was set up. For this experiment, an electric arc was produced by a Miller Multimatic 200 AC/DC welding machine, in the TIG configuration, using a Tungsten gray band rod 3/32" and a piece of 1" thick Chromoly and argon gas was used for enhancing the electric arc stability. The welder was used in an DC configuration. The welding machine output was approximately 210 A at 18.4 V, 20% duty cycle. The melting point for Chromoly steel is about 1,432° C. and for the gray welding Tungsten rod 3/32" about 3,433° C., both were melted during each step of the experiment.

For data acquisition, the Raspberry Pi 4 Model B Micro-controller together with a data acquisition board DAQC2Plate 6 were used with the Opto Diode SXUV100 UV sensor. The Opto Diode SXUV100 UV sensor has a maximum response time of 6 μs, and was connected to the analog input 0 of the data acquisition board in parallel with a 1800Ω resistor.

Measurements of temperature were taken by placing the sensor at various distances from the discharge or thermal source, namely 1.04 m, 1.4 m, 2.21 m and 2.95 m. Using Equation 5, the curve of diode output current vs. temperature for each of those distances was computed and plotted in FIGS. 12a, 12b, 12c, and 12d. The maximum current obtained in the measurements performed for each of the distances is plotted, to indicate the estimated temperature for each measurement where the maximum current value crosses the current vs. temperature plot. The attenuation coefficient was considered constant for all frequencies in the radiation impacting the diode, and the reflection of the room where the experiment was realized was considered also constant. It may be observed that the maximum current intersects the current vs. temperature in a range from 2900° K to 3900° K, while two of the plots show an intersection at about 3400° K, which is the expected temperature of the discharge. The variation is attributed to attenuation and reflection processes.

In light of the foregoing description, it should be recognized that embodiments in accordance with the present invention can be realized in numerous configurations contemplated to be within the scope and spirit of the claims. Additionally, the description above is intended by way of example only and is not intended to limit the present invention in any way, except as set forth in any future claim.

What is claimed is:

1. An ultraviolet sensing assembly for performing non-contact temperature measurements, comprising:
    a detector comprising a photodiode and a resistor;
    an analog-to-digital converter;
    a micro-controller; and
    a digital display;
    wherein the detector, the analog-to-digital converter, and the digital display are functionally connected to the micro-controller;
    wherein the detector is adapted to detect photons from ultraviolet radiation emitted from a high-temperature thermal source and to convert said photons from the high-temperature thermal source, via the photodiode, into a current of electrons that produces a corresponding analog voltage signal across the resistor;
    wherein the analog-to-digital converter is adapted to receive the analog voltage signal corresponding to the current of electrons from the detector and to convert the received analog voltage signal into a digital signal;
    wherein the micro-controller is adapted to receive the digital signal;
    wherein, by means of the following equation:

$$i = \int_{\lambda_{min}}^{\lambda_{max}} \frac{2hc^2}{\lambda^5} \frac{1}{e^{\frac{hc}{\lambda kT}} - 1} 4\pi r_d^2 \frac{A}{x^2} e^{-\alpha x} \mathcal{R}(\lambda) d\lambda$$

the micro-controller is adapted to integrate the current of electrons to calculate a value for the temperature of the high-temperature thermal source; and wherein the display is adapted to display the temperature of the high-temperature thermal source.

* * * * *